(12) United States Patent
Yoshikawa

(10) Patent No.: US 8,938,099 B2
(45) Date of Patent: Jan. 20, 2015

(54) IMAGE PROCESSING APPARATUS, METHOD OF CONTROLLING THE SAME, DISTANCE MEASUREMENT APPARATUS, AND STORAGE MEDIUM

(75) Inventor: Hiroshi Yoshikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 13/312,206

(22) Filed: Dec. 6, 2011

(65) Prior Publication Data
US 2012/0154577 A1 Jun. 21, 2012

(30) Foreign Application Priority Data
Dec. 15, 2010 (JP) ................................. 2010-279862

(51) Int. Cl.
*H04N 7/18* (2006.01)
*G01B 11/25* (2006.01)
*H04N 5/225* (2006.01)

(52) U.S. Cl.
CPC .............. *H04N 7/18* (2013.01); *G01B 11/2545* (2013.01); *H04N 5/2256* (2013.01)
USPC ......................................... 382/106; 382/154

(58) Field of Classification Search
USPC .................................................. 382/106, 154
See application file for complete search history.

(56) References Cited

U.S. PATENT DOCUMENTS
2013/0125408 A1* 5/2013 Atwell et al. .................... 33/503

FOREIGN PATENT DOCUMENTS
JP 3800842 B 7/2006

* cited by examiner

*Primary Examiner* — Sath V Perungavoor
*Assistant Examiner* — Jeffery Williams
(74) *Attorney, Agent, or Firm* — Fitzpatrick, Cella, Harper & Scinto

(57) ABSTRACT

An image processing apparatus includes a projection unit adapted to project pattern-light onto an object; an image capturing unit adapted to capture the object; a calculation unit adapted to calculate a line direction of the pattern-light in each predetermined region of the image; a decision unit adapted to decide an epipolar-line based on a relationship between the projection unit and the image capturing unit; a determination unit adapted to determine whether an angle made by the direction of the epipolar-line and the line direction is not more than a predetermined value; and a detection unit adapted to detect a first-region when the angle is not more than the predetermined value, and detect a second-region when the angle is more than the predetermined value. The projection unit projects the pattern-light having a line component parallel to the epipolar-line.

9 Claims, 13 Drawing Sheets

FIG. 11A
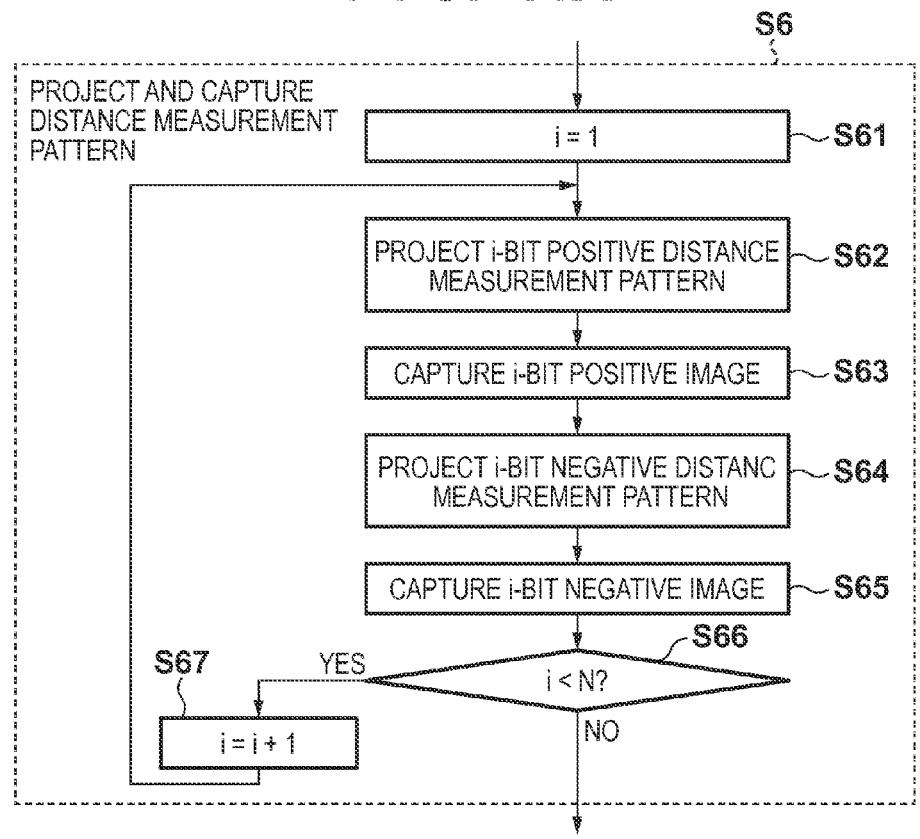
FIG. 11B
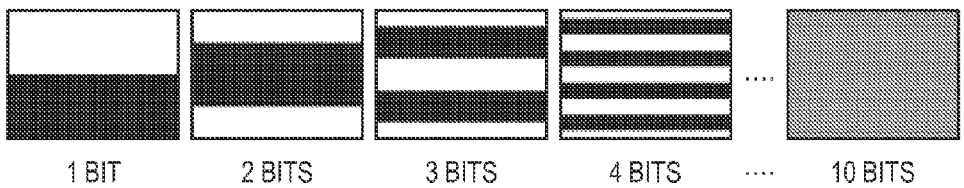

IMAGE PROCESSING APPARATUS, METHOD OF CONTROLLING THE SAME, DISTANCE MEASUREMENT APPARATUS, AND STORAGE MEDIUM

BACKGROUND OF THE INVENTION

1. Field of the Invention

The present invention relates to an image processing apparatus, a method of controlling the same, a distance measurement apparatus, and a storage medium and, more particularly, to an image processing apparatus for reducing influence of noise generated by multiple reflection that occurs due to the surface property, shape, and arrangement of image capturing target objects, a method of controlling the same, a distance measurement apparatus, and a storage medium.

2. Description of the Related Art

When the glossiness of image capturing target objects is high, and their shapes and arrangement are complex, a plurality of number of times of reflection, that is, multiple reflection occurs between the image capturing target objects. The multiple reflection occurs between image capturing targets and is therefore also called mutual reflection. When multiple reflection occurs, a ghost image that should be absent among the image capturing target objects is generated. When image processing is applied to such a captured image, the ghost image appears as noise. Hence, a problem may be posed by the malfunction of image processing.

Especially, in a pattern projection method that uses pattern light to measure the distance of an image capturing target object, the influence of the ghost image is conspicuous. The principle of the pattern projection method will be described first, and the influence will then be described.

In the pattern projection method, the three-dimensional distance of a measurement target object is calculated by triangulation based on the output angle of pattern light from an illumination apparatus, the incident angle of the pattern light that is reflected by the measurement target object and becomes incident on an image capturing apparatus, and the distance between the illumination apparatus and the image capturing apparatus. The incident angle of the image capturing apparatus can easily be obtained by calibrating the corresponding relationship between the incident angle and the pixel coordinates of the image sensor. Various methods such as a light-section method and a spatial encoding method have been proposed to obtain the output angle of pattern light.

In the spatial encoding method, pattern light formed from a plurality of line light components is projected onto a measurement target object. The line numbers of the plurality of line light components are identified by various encoding methods. As the encoding methods for identifying the line numbers, a gray code method, a rainbow method, and the like are known. In the gray code method, binary pattern light components having different periods are sequentially projected. The line numbers are identified using encoding in the temporal direction. The output angle can be obtained because the output angle and the line numbers are calibrated in advance.

In the pattern projection method, under the condition that the measurement target objects have a high surface scattering property and simple shapes and arrangement, 1st-order reflected light is dominant in the light reflected by the measurement target objects, and the processing effectively functions. However, under the condition that the measurement target objects have a high glossiness and complex shapes and arrangement, multiple reflection occurs between the measurement target objects. When multiple reflection occurs, the light is reflected to an angle different from the output angle of light from the projection apparatus. When the multiple reflected light becomes incident on the image capturing apparatus, the output angle of the light beam is erroneously detected, resulting in an error in distance measurement.

A related art for this problem is a method described in Japanese Patent No. 3800842. Japanese Patent No. 3800842 discloses a method using the property of reflection that causes inversion of an image. That is, since the increase/decrease in the line number is inverted in a region where multiple reflected light is generated, a multiple reflected light region is detected based on it.

The method described in Japanese Patent No. 3800842 can detect a measurement error caused by an even number of times of multiple reflection but not a measurement error caused by an odd number of times of multiple reflection. Additionally, an error may occur upon determining a region where both 1st-order reflected light and multiple reflected light exist. If a measurement target object has a step shape, the increase/decrease in the line number may be inverted even without reflection. As described above, there has not been proposed any distance measurement technique capable of effectively detecting a region where multiple reflection between measurement target objects occurs.

In consideration of the above-described problems, the present invention provides a technique of reducing the influence of noise generated by multiple reflection by detecting a multiple reflected light region using pattern projection and simple image processing.

SUMMARY OF THE INVENTION

According to one aspect of the present invention, there is provided an image processing apparatus comprising: a projection unit adapted to project pattern light onto an image capturing target object; an image capturing unit adapted to capture an image of the image capturing target object on which the pattern light is projected; a calculation unit adapted to calculate a direction of a line of the pattern light in each predetermined region of the image; a decision unit adapted to decide an epipolar line based on a relative positional relationship between the projection unit and the image capturing unit; a determination unit adapted to determine whether an angle made by the direction of the epipolar line and the direction of the line is not more than a predetermined value; and a detection unit adapted to, upon determining that the angle is not more than the predetermined value, detect the region as a first region, and upon determining that the angle is more than the predetermined value, detect the region as a second region, wherein the projection unit projects the pattern light having a line component parallel to the epipolar line.

According to one aspect of the present invention, there is provided a method of controlling an image processing apparatus, comprising: causing a projection unit to project pattern light onto an image capturing target object; causing an image capturing unit to capture an image of the image capturing target object on which the pattern light is projected; calculating a direction of a line of the pattern light in each predetermined region of the image; deciding an epipolar line based on a relative positional relationship between the projection unit and the image capturing unit; determining whether an angle made by the direction of the epipolar line and the direction of the line is not more than a predetermined value; and upon determining that the angle is not more than the predetermined value, detecting the region as a first region, and upon determining that the angle is more than the predetermined value, detecting the region as a second region, wherein in the causing the projection unit to project the pattern light, the pattern light having a line component parallel to the epipolar line is projected.

Further features of the present invention will be apparent from the following description of exemplary embodiments with reference to the attached drawings.

BRIEF DESCRIPTION OF THE DRAWINGS

FIGS. 11A and 11B are respectively a flowchart showing the processing procedure of step S6 and an explanatory view of a distance measurement pattern;

DESCRIPTION OF THE EMBODIMENTS

Figure 1:
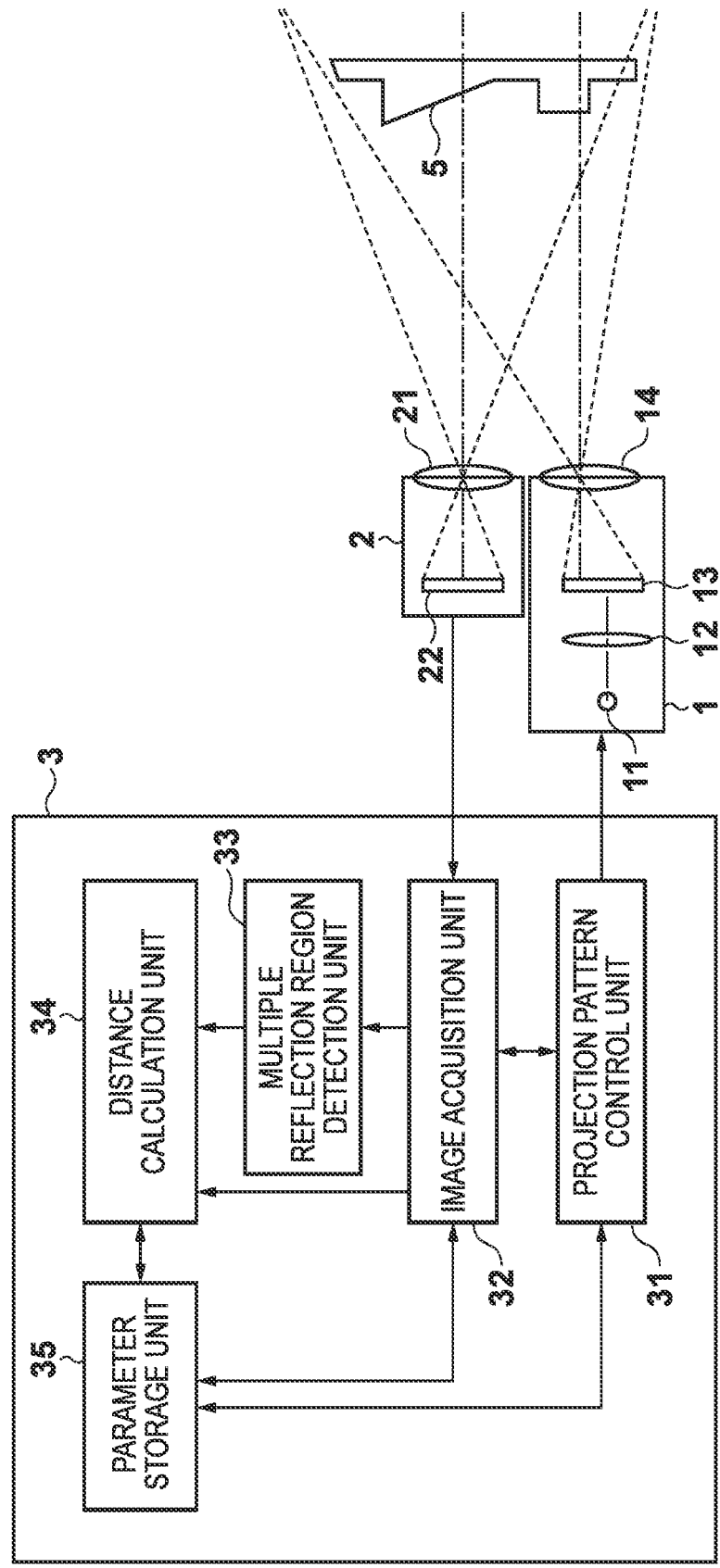
FIG. 1 is a view showing an example of the arrangement of an image processing apparatus (distance measurement apparatus) according to the first embodiment.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

The schematic arrangement of an image processing apparatus (distance measurement apparatus) according to the first embodiment will be described first with reference to FIG. 1. The distance measurement apparatus includes a projection unit 1, an image capturing unit 2, and a control/calculation processing unit 3.

The projection unit 1 projects pattern light such as line pattern light onto a measurement target object 5. The image capturing unit 2 captures the measurement target object 5 on which the pattern light is projected. The control/calculation processing unit 3 controls the projection unit 1 and the image capturing unit 2 and performs calculation processing of the captured image data to measure the distance up to the measurement target object 5.

The projection unit 1 includes a light source 11, an illumination optical system 12, a display element 13, and a projection optical system 14. The light source 11 can use various kinds of light-emitting elements such as a halogen lamp and an LED. The illumination optical system 12 has a function of guiding light output by the light source 11 to the display element 13. When the light emitted by the light source becomes incident on the display element 13, the incident luminance is preferably uniform. For this purpose, the illumination optical system 12 uses an optical system suitable for uniforming the luminance, such as Koehler illumination or a diffuser. The display element 13 is, for example, a transmissive LCD or a reflective LCOS•DMD. The display element 13 has a function of spatially controlling the transmittance or the reflectance when guiding the light from the illumination optical system 12 to the projection optical system 14. The projection optical system 14 is an optical system configured to form an image of the display element 13 at a specific position on the measurement target object 5. In this embodiment, a projection apparatus including a display element and a projection optical system has been described. However, a projection apparatus including spot light and a two-dimensional scanning optical system is also usable.

The image capturing unit 2 includes an image capturing lens 21 and an image sensor 22. The image capturing lens 21 is an optical system configured to form an image of the specific position of the measurement target object 5 on the image sensor 22. The image sensor 22 can use various kinds of photoelectric conversion elements such as a CMOS sensor and a CCD sensor.

Note that FIG. 1 illustrates an arrangement in which the projection unit 1 and the image capturing unit 2 are arranged almost in parallel.

The control/calculation processing unit 3 includes a projection pattern control unit 31, an image acquisition unit 32, a multiple reflection region detection unit 33, a distance calculation unit 34, and a parameter storage unit 35. The hardware of the control/calculation processing unit 3 is formed from a general-purpose computer (hardware) including a CPU, a memory, a storage device such as a hard disk, and various kinds of input/output interfaces. The software of the control/calculation processing unit 3 includes a distance measurement program that causes a computer to execute a distance measurement method according to the present invention.

The CPU executes the distance measurement program, thereby implementing the projection pattern control unit 31, the image acquisition unit 32, the multiple reflection region detection unit 33, the distance calculation unit 34, and the parameter storage unit 35.

The projection pattern control unit 31 generates a projection pattern to be described later and stores it in the storage device in advance. The projection pattern control unit 31 also reads out the data of the stored projection pattern as needed, and transmits the projection pattern data to the projection unit 1 via a general-purpose display interface such as DVI. The projection pattern control unit 31 also has a function of controlling the operation of the projection unit 1 via a general-purpose communication interface such as RS232C or IEEE488. Note that the projection unit 1 displays the projection pattern on the display element 13 based on the received projection pattern data.

The control/calculation processing unit 32 receives a digital image signal sampled and digitized by the image capturing unit 2. The image acquisition unit 32 also has a function of acquiring image data represented by the luminance (density value) of each pixel from the received image signal and storing the image data in the memory. Note that the image acquisition unit 32 has a function of controlling the operation (for example, image capturing timing) of the image capturing unit 2 via a general-purpose communication interface such as RS232C or IEEE488.

The image acquisition unit 32 and the projection pattern control unit 31 operate in synchronism with each other. When pattern display on the display element 13 is completed, the projection pattern control unit 31 transmits a signal to the image acquisition unit 32. Upon receiving the signal from the projection pattern control unit 31, the image acquisition unit 32 operates the image capturing unit 2 to execute image capturing. When image capturing is completed, the control/calculation processing unit 32 transmits a signal to the projection pattern control unit 31. Upon receiving the signal from the image acquisition unit 32, the projection pattern control unit 31 switches the projection pattern to be displayed on the display element 13 to the next projection pattern. This processing is sequentially repeated to execute image capturing of all projection patterns.

The multiple reflection region detection unit 33 detects a multiple reflection region based on the captured image of the multiple reflection region detection pattern projected by the projection unit 1. Multiple reflection means that, for example, reflection occurs a plurality of number of times on an image capturing target object. Details will described later.

The distance calculation unit 34 calculates the distance up to the measurement target object 5 using the captured image of the distance measurement pattern, parameters stored in the parameter storage unit 35, and the detection result of the multiple reflection region detection unit 33.

The parameter storage unit 35 stores parameters necessary for calculating the three-dimensional distance. Examples of the parameters are the device parameters of the projection unit 1 and the image capturing unit 2, the internal parameters of the projection unit 1 and the image capturing unit 2, the external parameters of the projection unit 1 and the image capturing unit 2, and the parameters of the projection patterns.

The device parameters of the projection unit 1 and the image capturing unit 2 are the number of pixels of the display element and the number of pixels of the image sensor. The internal parameters of the projection unit 1 and the image capturing unit 2 are the focal length, the image center, the coefficient of image distortion caused by distortion, and the like. The external parameters of the projection unit 1 and the image capturing unit 2 are a translation matrix and a rotation matrix, which represent the relative positional relationship between the projection unit 1 and the image capturing unit 2. The parameters of the projection patterns are information about the distance measurement pattern and the multiple reflection region detection pattern.

In this embodiment, an explanation will be made assuming that both the projection unit 1 and the image capturing unit 2 are approximated by a pinhole camera model. However, the camera model to which the present invention is applicable is not limited to the pinhole camera.

Figure 2:
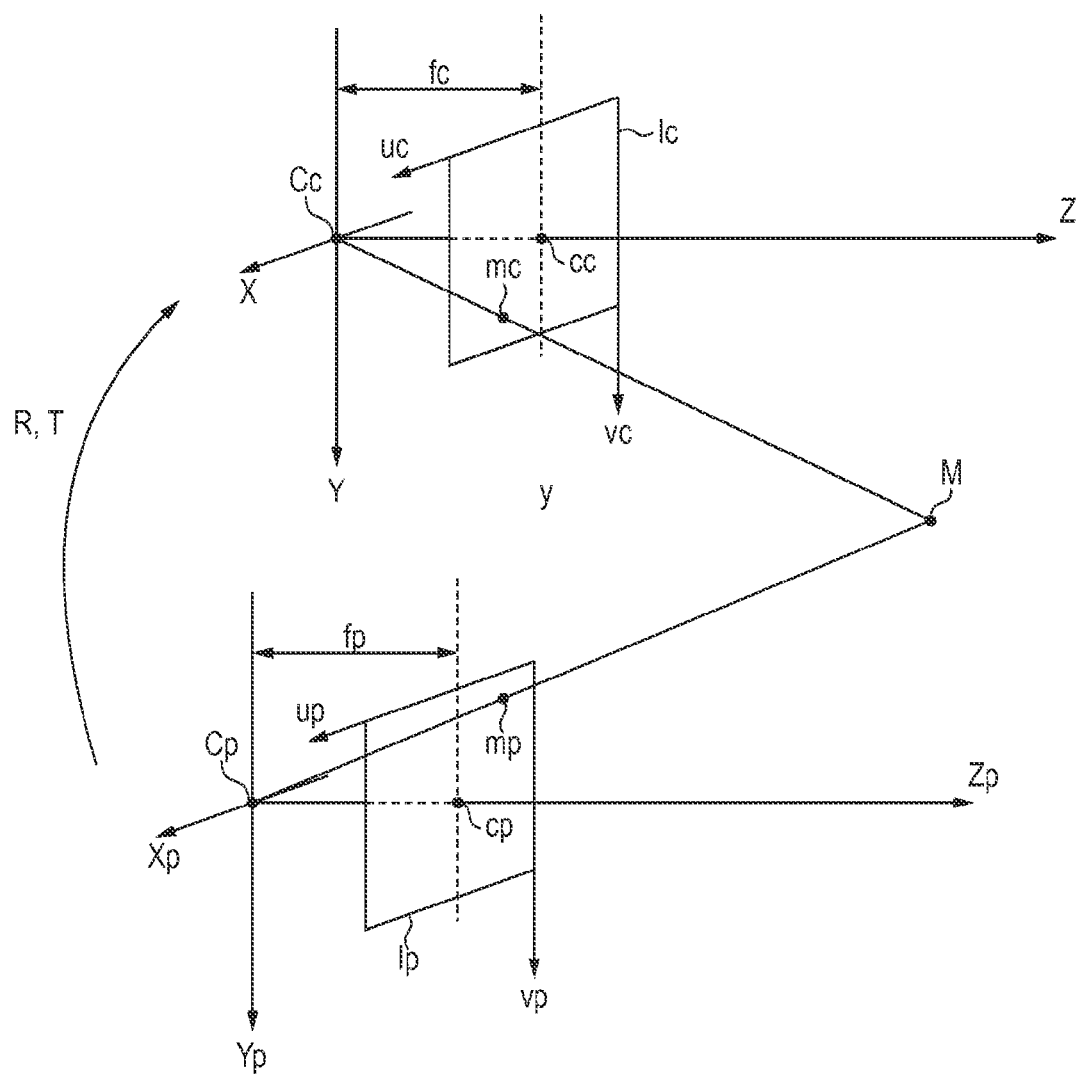
FIG. 2 is a view for explaining the principle of distance measurement by triangulation.

The principle of distance measurement by triangulation will be described with reference to FIG. 2. Let Cc be the lens center of the image capturing unit, Ic be the image plane, fc be the focal length, (uco,vco) be the pixel coordinates of an image center cc, and Psc is the pixel size of the image sensor. An internal matrix Ac of the image capturing unit is given by $$Ac = \begin{bmatrix} fc/Psc & 0 & uco \\ 0 & fc/Psc & vco \\ 0 & 0 & 1 \end{bmatrix} \quad (1)$$

In addition, Let Cp be the lens center of the projection unit, Ip be the image plane, fp be the focal length, (upo,vpo) be the pixel coordinates of an image center cp, and Psp is the pixel size of the display element. An internal matrix Ap of the projection unit is given by $$Ap = \begin{bmatrix} fp/Psp & 0 & upo \\ 0 & fp/Psp & vpo \\ 0 & 0 & 1 \end{bmatrix} \quad (2)$$

The internal matrix Ac of the image capturing unit and the internal matrix Ap of the projection unit are calculated using an internal parameter calibration method that is a known technique.

The external parameters representing the relative positional relationship between the camera coordinate system XYZ of the image capturing unit and the camera coordinate system XpYpZp of the projection unit are a rotation matrix R and a translation matrix T. The rotation matrix R is a 3×3 matrix, and the translation matrix T is a 3×1 matrix. The rotation matrix R and the translation matrix T are calculated using an external parameter calibration method that is a known technique.

Let (X,Y,Z) be the coordinates of a point M in a three-dimensional space having the camera coordinate system of the image capturing unit as the origin. Let (uc,vc) be the pixel coordinates of a point mc formed by projecting the point M onto the image plane Ic of the image capturing unit. The corresponding relationship is expressed as $$s \begin{bmatrix} uc \\ vc \\ 1 \end{bmatrix} = [Ac \; 0] \begin{bmatrix} X \\ Y \\ Z \\ 1 \end{bmatrix} = \begin{bmatrix} C_{11} & C_{12} & C_{13} & C_{14} \\ C_{21} & C_{22} & C_{23} & C_{24} \\ C_{31} & C_{32} & C_{33} & C_{34} \end{bmatrix} \begin{bmatrix} X \\ Y \\ Z \\ 1 \end{bmatrix} \quad (3)$$

where s is the scalar. Let (up,vp) be the pixel coordinates of a point mp formed by projecting the same point M onto the image plane Ip of the projection unit.

The corresponding relationship is expressed as $$s' \begin{bmatrix} up \\ vp \\ 1 \end{bmatrix} = \begin{bmatrix} R & T \\ 0 & 1 \end{bmatrix} [Ap \; 0] \begin{bmatrix} X \\ Y \\ Z \\ 1 \end{bmatrix} = \begin{bmatrix} P_{11} & P_{12} & P_{13} & P_{14} \\ P_{21} & P_{22} & P_{23} & P_{24} \\ P_{31} & P_{32} & P_{33} & P_{34} \end{bmatrix} \begin{bmatrix} X \\ Y \\ Z \\ 1 \end{bmatrix} \quad (4)$$

where s' is the scalar. When expressions (3) and (4) are expanded, we obtain four simultaneous equations given by $$\begin{aligned}(C_{11} - C_{31}uc)X + (C_{12} - C_{32}uc)Y + (C_{13} - C_{33}uc)Z &= C_{34}uc - C_{14} \\ (C_{21} - C_{31}vc)X + (C_{22} - C_{32}vc)Y + (C_{23} - C_{33}vc)Z &= C_{34}vc - C_{24} \\ (P_{11} - P_{31}up)X + (P_{12} - P_{32}up)Y + (P_{13} - P_{33}up)Z &= P_{34}up - P_{14} \\ (P_{21} - P_{31}vp)X + (P_{22} - P_{32}vp)Y + (P_{23} - P_{33}vp)Z &= P_{34}vp - P_{24}\end{aligned} \quad (5)$$

The pixel coordinates (uc,vc) of the point mc and the pixel coordinates (up,vp) of the point mp are obtained using various pattern projection methods described in "Background". In addition, since Cij (i=1 to 3, and i=1 to 3) and Pij (i=1 to 3, and i=1 to 3) are obtained in advance by calibration because they are calculated from the internal matrices and the external parameters. In equations (5), only the coordinate values (X,Y,Z) of the point M are unknown. The coordinate values can be obtained by solving the simultaneous equations. Note that since three coordinate values (X,Y,Z) of the point M are unknown and to be obtained, the coordinate values of the point M can be calculated by obtaining one of the pixel coordinate values (up,vp) of the projection unit. The principle of distance measurement based on triangulation has been described above.

If no multiple reflected light is generated, or if no influence becomes obvious even when multiple reflected light is generated, distance measurement of the measurement target object can be done using the above-described triangulation. However, when multiple reflected light is generated, and its influence becomes obvious, a measurement error occurs.

Figure 3:
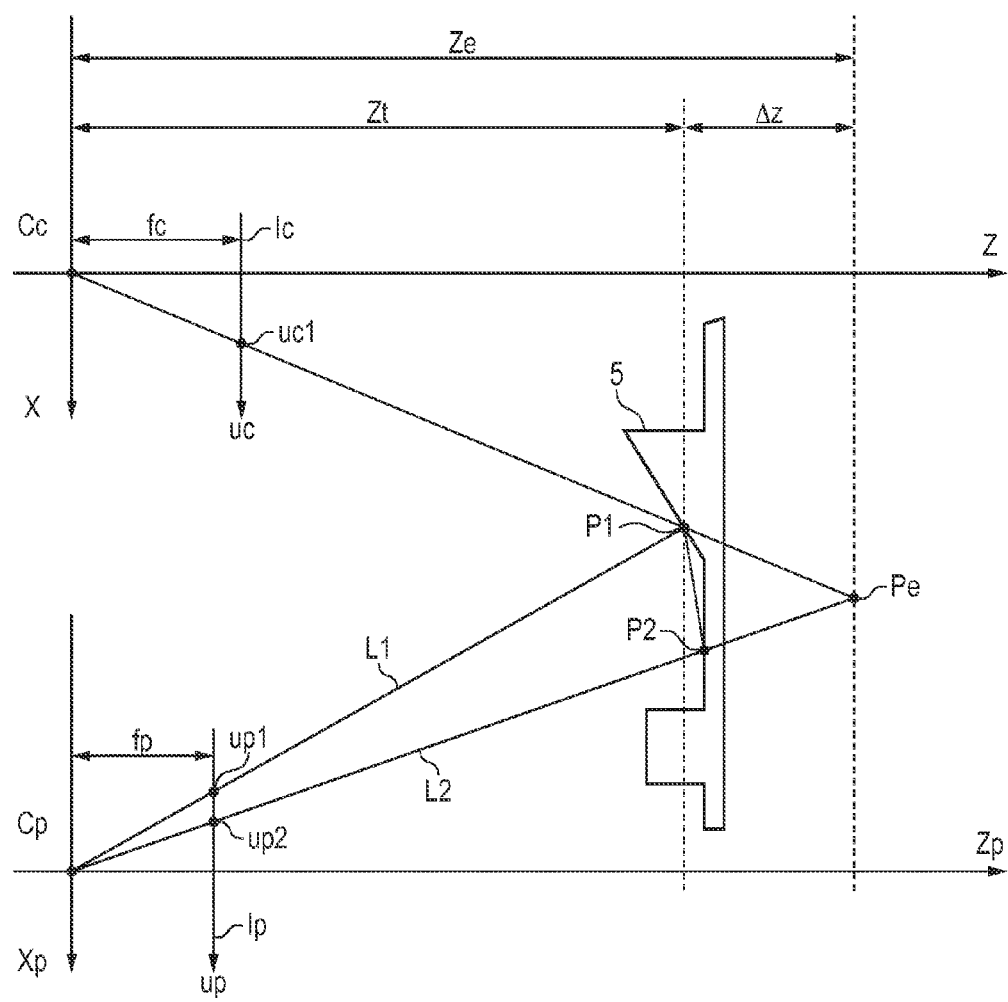
FIG. 3 is a view for explaining the mechanism of measurement error occurrence by multiple reflected light.

The mechanism of measurement error occurrence by multiple reflected light will be described with reference to FIG. 3. FIG. 3 shows a two-dimensional section along the X- and Z-axes for the descriptive convenience.

A light beam L1 that is output from the lens center Cp of the projection unit 1 in the direction in which the light beam passes through a point up1 on the image plane Ip becomes incident on a point P1 on the measurement target object 5. The light reflected at the point P1 intersects the image coordinates of the image capturing unit 2 at a point uc1 and becomes incident on the lens center Cc.

A light beam L2 that is output from the lens center Cp of the projection unit 1 in the direction in which the light beam passes through a point up2 on the image plane Ip becomes incident on a point P2 on the measurement target object 5. The light reflected at the point P2 is secondarily reflected at the point P1. After that, the light intersects the image coordinates of the image capturing unit 2 at the point uc1 and becomes incident on the lens center Cc of the projection unit 1. When secondary reflection occurs, the light that have originally been output from the lens center Cp of the projection unit 1 behaves as if it had been output from the point P2.

When the object has a low glossiness, and the influence of multiple reflection is small, the reflected light by the light beam L1 is dominant in the luminance observed by the image capturing unit 2. Since the pixel coordinate values are detected correctly as up1, a correct distance measurement result Zt is obtained.

On the other hand, when the object has a high glossiness, and the influence of multiple reflection is large, the reflected light by the light beam L2 is dominant. At this time, since the pixel coordinate values are erroneously detected as up2, the measurement is done assuming that the measurement point is Pe. The distance measurement result is Ze and an error $\Delta Z=Zt-Ze$ is generated.

Actually, not only the 2nd-order reflected light shown in FIG. 3 but also reflected light of 3rd and higher orders may also exist, and a more complex measurement error may be generated. The mechanism of measurement error occurrence by multiple reflected light has been described above.

In the present invention, however, the region where multiple reflected light is generated is detected by projecting a pattern using the characteristic of epipolar geometry.

Figure 4:
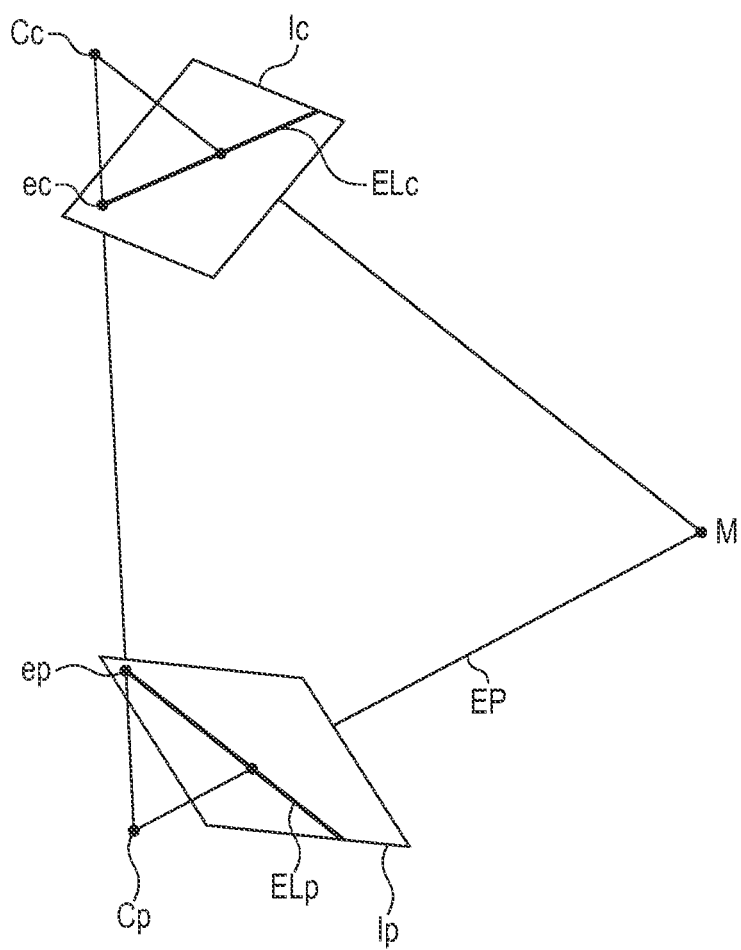
FIG. 4 is a view for explaining epipolar geometry.

The epipolar geometry will be explained with reference to FIG. 4. FIG. 4 illustrates the projection unit 1 and the image capturing unit 2 which are tilted as compared to FIG. 1 so as to help understanding the epipolar geometry. The point M in the three-dimensional space, the lens center Cp of the projection unit 1, and the lens center Cc of the image capturing unit 2 are present on one plane. This plane will be referred to as an epipolar plane EP. The intersections between the epipolar plane EP and the image planes Ic and Ip will be referred to as epipolar lines ELc and ELp, respectively. The points at which the epipolar lines intersect on the image planes Ic and Ip will be referred to as epipoles ec and ep, respectively.

The epipolar geometry has the following characteristic. Assume that the geometry representing the relative positional relationship between the projection unit 1, the image capturing unit 2, and the measurement target object is known. When one point on the image plane Ic of the image capturing unit 2 is decided, the epipolar line ELp on the image plane Ip of the projection unit 1 is decided. Similarly, when one point on the image plane Ip of the projection unit 1 is decided, the epipolar line ELc on the image plane Ic of the image capturing unit 2 is decided. A line pattern almost parallel to the epipolar line ELp on the image plane Ip of the projection unit 1 is projected onto the measurement target object 5. Then, the image capturing unit 2 captures a line pattern parallel to the epipolar line ELc on the image plane Ic of the image capturing unit 2. The line pattern almost parallel to the epipolar line ELp is pattern light having a line component in a direction parallel to the epipolar line ELp or in a direction within a predetermined angular range from that parallel direction.

Figure 5A:
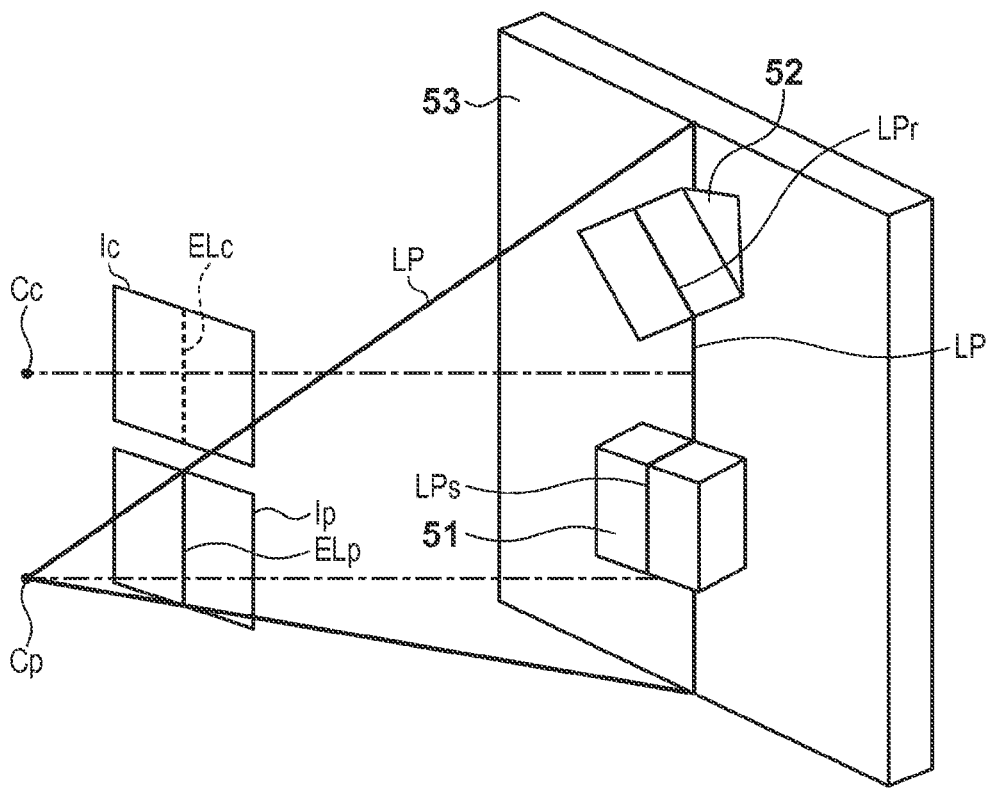
FIGS. 5A and 5B are views for explaining the principle of multiple reflected light region detection.
Figure 5B:
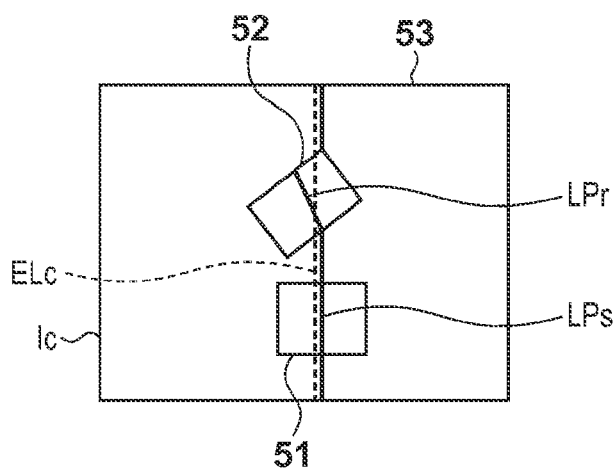

The principle of detecting a multiple reflected light region using the characteristic will be described with reference to FIGS. 5A and 5B. FIG. 5A shows the positional relationship between the measurement apparatus, the measurement target object 5, and the line pattern projected by the projection unit 1. FIG. 5B shows the image captured by the image capturing unit 2.

The projection unit 1 projects a line pattern LP almost parallel to the epipolar line ELp of the projection unit 1. Three measurement target objects 5, that is, a scattering object 51, a glossy object 52, and a background plate 53 are used. Note that the background plate 53 has a high scattering property.

On the scattering object 51, since the 1st-order reflected light of the projected line pattern is observed, the epipolar geometry holds, and a line LPs almost parallel to the epipolar line ELc of the image capturing unit 2 is observed. In the arrangement as shown in FIG. 5A, reflected light from the background plate 53 is stronger on the glossy object 52 than the reflected light of the line pattern projected by the projection unit 1. In the reflected light from the background plate 53, since the epipolar geometry does not hold, a line LPr not parallel to the epipolar line ELc of the image capturing unit 2 is observed.

That is, determining the presence/absence of a line not parallel to the epipolar line ELc of the image capturing unit 2 enables to detect the presence/absence of a multiple reflected light region.

The multiple reflected light region detection method using epipolar geometry according to the present invention has been described above.

Figure 6:
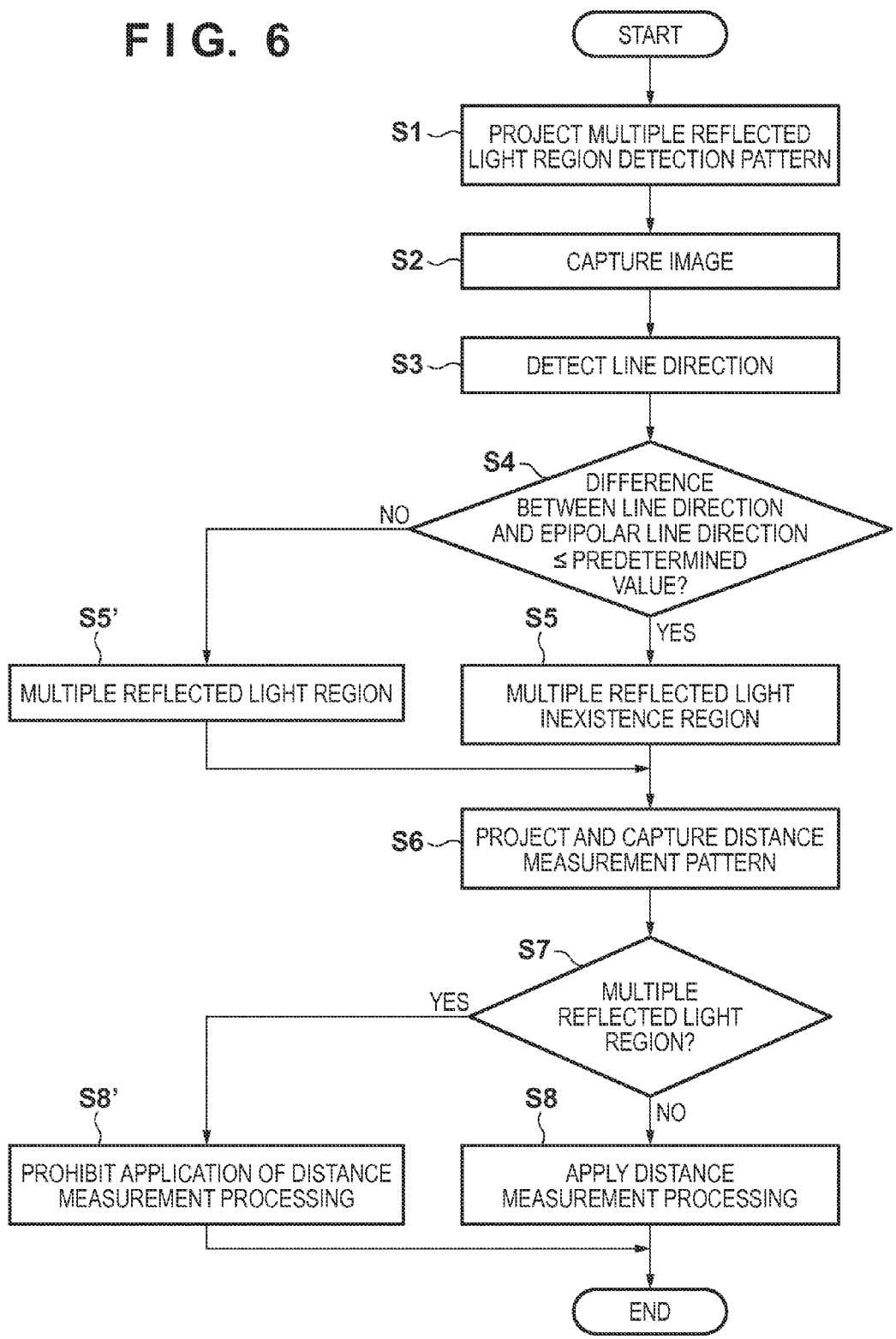
FIG. 6 is a flowchart illustrating the procedure of processing according to the first embodiment.

The procedure of multiple reflected light region detection processing according to the first embodiment will be described with reference to the flowchart of FIG. 6.

In step S1, the projection unit 1 projects the multiple reflected light region detection pattern onto the measurement target object 5. The multiple reflected light detection pattern is decided by obtaining the epipole ep on the image plane Ip of the projection unit 1. Since an epipolar line passes through an epipole as a characteristic, the direction of the epipolar line ELp can be decided by obtaining the epipole ep on the image plane Ip of the projection unit 1. The epipole ep is obtained from a fundamental matrix F. Based on the internal matrix Ap of the projection unit 1, the internal matrix Ac of the image capturing unit 2, and the rotation matrix R and the translation matrix T between the projection unit 1 and the image capturing unit 2, the fundamental matrix F is obtained by $$F = Ac^{-T}[T]_x R(Ap)^{-1} \qquad (6)$$

where $[\ ]_x$ represents the transformation of $$\begin{bmatrix} a_1 \\ a_2 \\ a_3 \end{bmatrix}_x = \begin{bmatrix} 0 & -a_3 & a_2 \\ a_3 & 0 & -a_1 \\ -a_2 & a_1 & 0 \end{bmatrix} \quad (7)$$

The epipole ep of the projection unit 1 is calculated as an eigenvector corresponding to the minimum eigenvalue of $FF^T$.

Figures 7A, 7B, 7C:
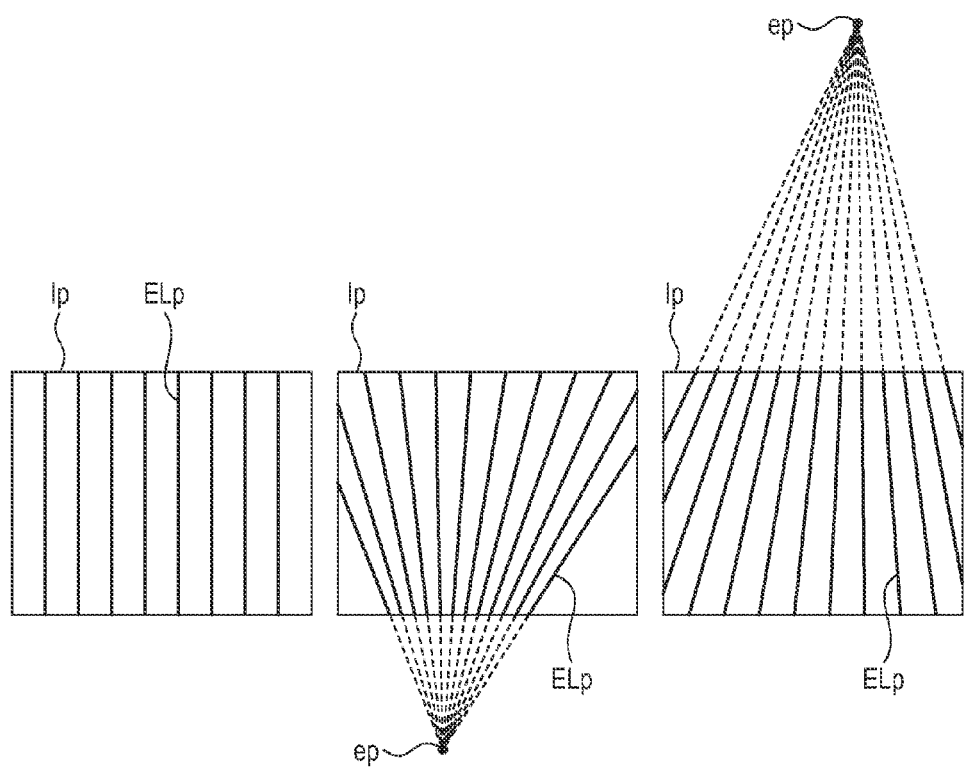
FIGS. 7A to 7C are views showing examples of a multiple reflected light region detection pattern.

FIGS. 7A to 7C show examples of the multiple reflected light region detection pattern. FIG. 7A shows a pattern when the epipole exists at infinity. This pattern is formed when the projection unit 1 and the image capturing unit 2 shown in FIG. 1 are arranged in parallel. FIG. 7B shows an example when the epipole exists below the image plane. FIG. 7C shows an example when the epipole exists above the image plane. These patterns are formed when the projection unit 1 and the image capturing unit 2 are not arranged in parallel.

In step S2, the image capturing unit 2 captures the measurement target object 5 on which the multiple reflected light region detection pattern is projected.

Figure 8A:
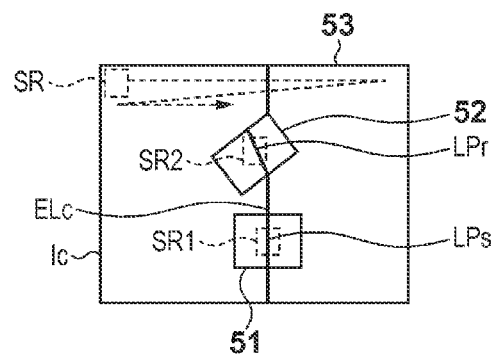
FIGS. 8A to 8D are explanatory views of line direction detection by edge detection filters.

In step S3, the image acquisition unit 32 acquires the image captured in step S2, and the multiple reflection region detection unit 33 detects (extracts) the line direction from the image. At this time, the image is divided into subregions SR each having a specific size, as shown in FIG. 8A, and the line direction is detected in each subregion SR. In addition, the subregions SR are two-dimensionally scanned on the screen, as indicated by the dotted arrow in FIG. 8A. In the first embodiment, the line direction is detected using edge detection filters.

The principle of line direction detection using the edge detection filters will be described next with reference to FIGS. 8B, 8C, and 8D.

Figure 8B:
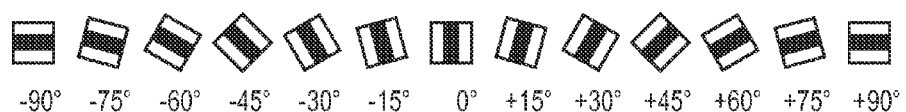
Figure 8C:
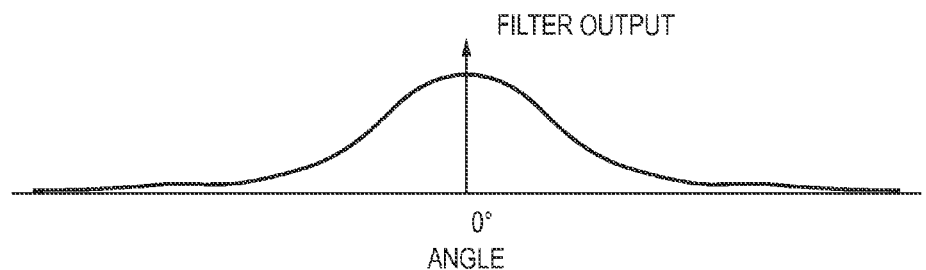
Figure 8D:
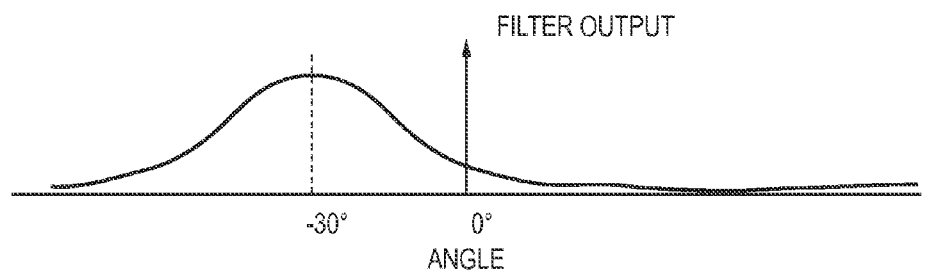

FIG. 8B shows examples of the edge detection filters. A plurality of edge detection filters are prepared in a specific angular step. Although FIG. 8B shows filters in steps of 15°, the present invention is not limited to this. Using the edge detection filters, a large value is output when the angle of the line direction of the subregion SR is closer to that of the line direction of a filter. In a subregion SR1 on the scattering object 51, the output is maximum at 0°, as shown in FIG. 8C. On the other hand, in a subregion SR2 on the glossy object 52, the output is maximum at −30°, as shown in FIG. 8D. In step S3, the angle at which the output is maximum is output as the line direction.

In step S4, the multiple reflection region detection unit 33 compares the line direction of each subregion SR detected in step S3 with the direction of an epipolar line, corresponding to the subregion SR, on the image plane of the image capturing unit 2. Upon determining that the difference between the line direction detected in step S3 and the epipolar line direction is equal to or smaller than a predetermined value (YES in step S4), the process advances to step S5. In step S5, the multiple reflection region detection unit 33 labels the subregion as a multiple reflected light inexistence region (1st-order reflected light region where the pattern light is reflected only once; first region). On the other hand, upon determining that the difference between the line direction detected in step S3 and the epipolar line direction is larger than the predetermined value (NO in step S4), the process advances to step S5'. In step S5', the multiple reflection region detection unit 33 labels the subregion as a multiple reflected light existence region (second region).

The direction of the epipolar line ELc of the image capturing unit 2 is calculated by obtaining the epipole ec of the image capturing unit 2. The epipole ec of the image capturing unit 2 is calculated as an eigenvector corresponding to the minimum eigenvalue of $F^T F$.

Figures 9A, 9B, 9C:
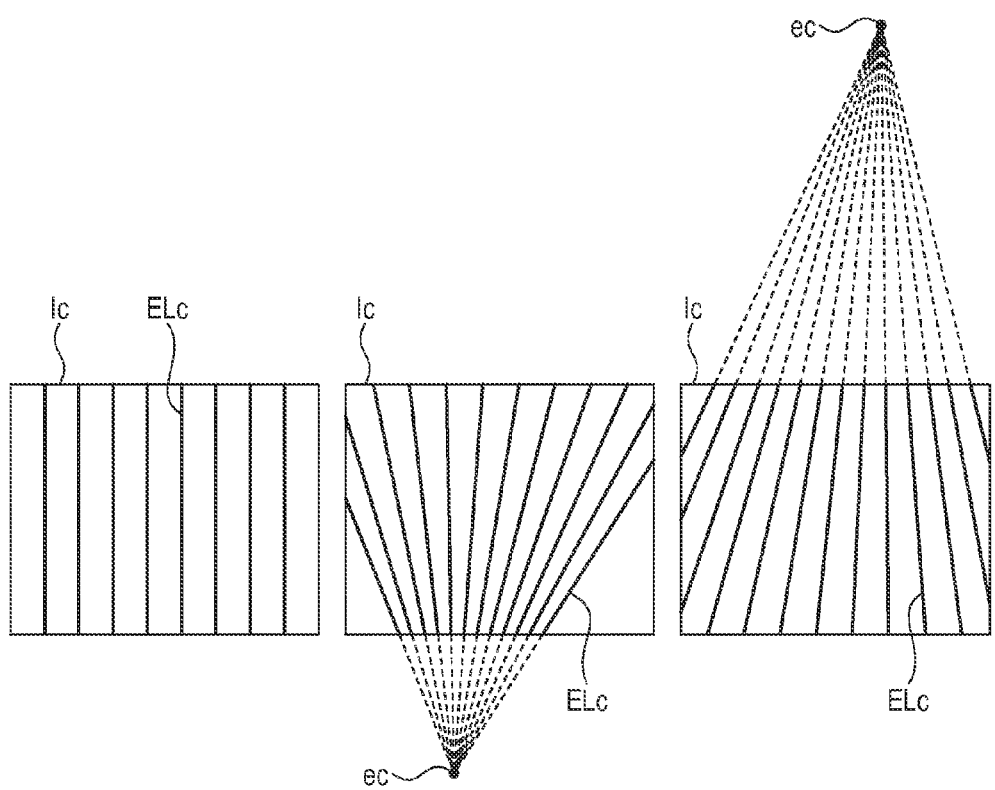
FIGS. 9A to 9C are views showing examples of epipolar line directions on a captured image.

FIGS. 9A to 9C show examples of epipolar line directions on a captured image. FIG. 9A shows an image of when the epipole exists at infinity. This image is formed when the projection unit 1 and the image capturing unit 2 shown in FIG. 1 are arranged in parallel. FIG. 9B shows an example of when the epipole exists below the image plane. FIG. 9C shows an example of when the epipole exists above the image plane. These patterns are formed when the projection unit 1 and the image capturing unit 2 are not arranged in parallel.

Figure 10A:
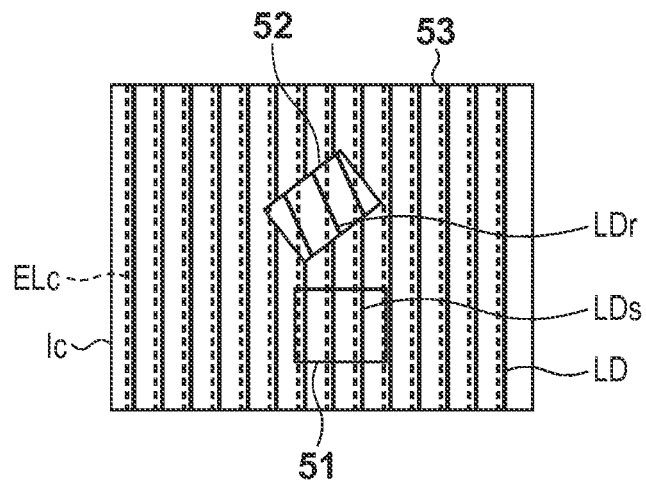
FIGS. 10A and 10B are views showing examples of labeling based on a line direction detection result.
Figure 10B:
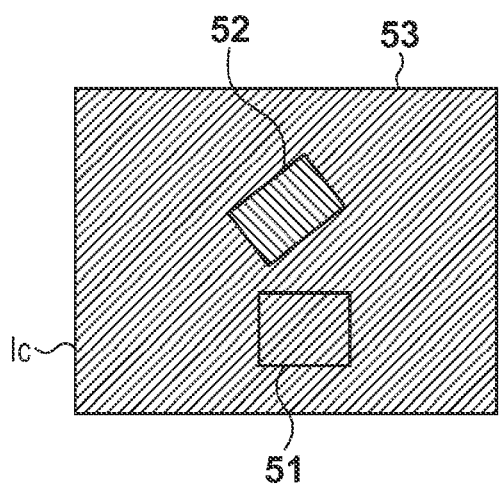

FIG. 10A is a view showing the epipolar line ELc by a dotted line and a detected line direction LD by a solid line. On the scattering object 51 and the background plate 53, the detected line direction LD matches the epipolar line direction ELc. Hence, each of the scattering object 51 and the background plate 53 forms a multiple reflected light inexistence region. On the other hand, on the glossy object 52, the detected line direction LD does not match the epipolar line direction ELc. Hence, the glossy object 52 forms a multiple reflected light region. FIG. 10B shows a result after labeling the multiple reflected light inexistence region and the multiple reflected light region. The multiple reflected light inexistence regions are represented by forward diagonal hatching, and the multiple reflected light region is represented by backward diagonal hatching.

In step S6, the projection pattern control unit 31 controls the projection unit 1 and the image capturing unit 2 and causes them to project and capture a distance measurement pattern. In the first embodiment, a gray code method is used as the pattern projection method. However, the pattern projection method applicable to the present invention is not limited to the gray code method. FIG. 11A shows the detailed procedure of step S6. FIG. 11B shows the distance measurement pattern. An explanation will be made assuming that the number of bits of encoding is 10.

In step S61, the projection pattern control unit 31 sets a control variable i to 1.

In step S62, the projection unit 1 projects an i-bit positive distance measurement pattern onto the measurement target object 5.

In step S63, the image capturing unit 2 captures an i-bit positive image.

In step S64, the projection unit 1 projects an i-bit negative distance measurement pattern onto the measurement target object 5.

In step S65, the image capturing unit 2 captures an i-bit negative image.

In step S66, the projection pattern control unit 31 determines whether the control variable i is smaller than N. Upon determining that the control variable i is smaller than the integer N (YES in step S66) the process advances to step S67. In step S67 the projection pattern control unit 31 increments the control variable i by one. N is an integer corresponding to the number of bits of encoding. In this example, N=10. On the other hand, upon determining that the relationship i<1 does not hold (that is, when i=10) (NO in step S66), the process of step S6 ends, and the process advances to step S7.

In step S7, the multiple reflection region detection unit 33 determines, based on the multiple reflected light region label added to each captured image subregion in steps S4, S5, and S5', whether the subregion is a multiple reflected light region. Upon determining that the subregion is a multiple reflected light region (YES in step S7), the process advances to step S8', and the distance calculation unit 34 does not perform distance measurement processing. Upon determining that the subregion is a multiple reflected light inexistence region (NO in step S7), the process advances to step S8, and the distance calculation unit 34 performs distance measurement processing. In the distance measurement processing, the distance calculation unit 34 obtains the pixel coordinate values of the projection unit 1 using the positive and negative images for i=1 to 10. A detailed method will be explained. The distance calculation unit 34 compares the luminance value of a positive image with that of a negative image for each of all bits of the captured image. If the luminance value of the positive image is larger than that of the negative image, 1 is output. If the luminance value of the positive image is smaller than that of the negative image, 0 is output. The values of 0 and 1 are arranged sequentially from i=1 to i=10 to obtain a gray code value. The gray code value is converted into a special code value to obtain the pixel coordinates of the projection unit 1. Since the pixel coordinates of the image capturing unit 2 are also determined from the captured image, the above-described triangulation is applicable. The processing thus ends.

According to the first embodiment, a multiple reflected light region is detected. Distance measurement processing is not applied to the region. It is therefore possible to obtain a distance measurement result containing no error caused by multiple reflected light.

In the first embodiment, an example has been introduced in which after a line direction is detected using edge detection filters in various directions except the epipolar line direction, the presence/absence of a line in the epipolar line direction is determined. The present invention is not limited to this. The presence/absence of a line in the epipolar line direction may be determined based on only the output value of an edge detection filter in the epipolar line direction.

The distance measurement apparatus according to the first embodiment of the present invention has been described above.

(Second Embodiment)

Figure 12:
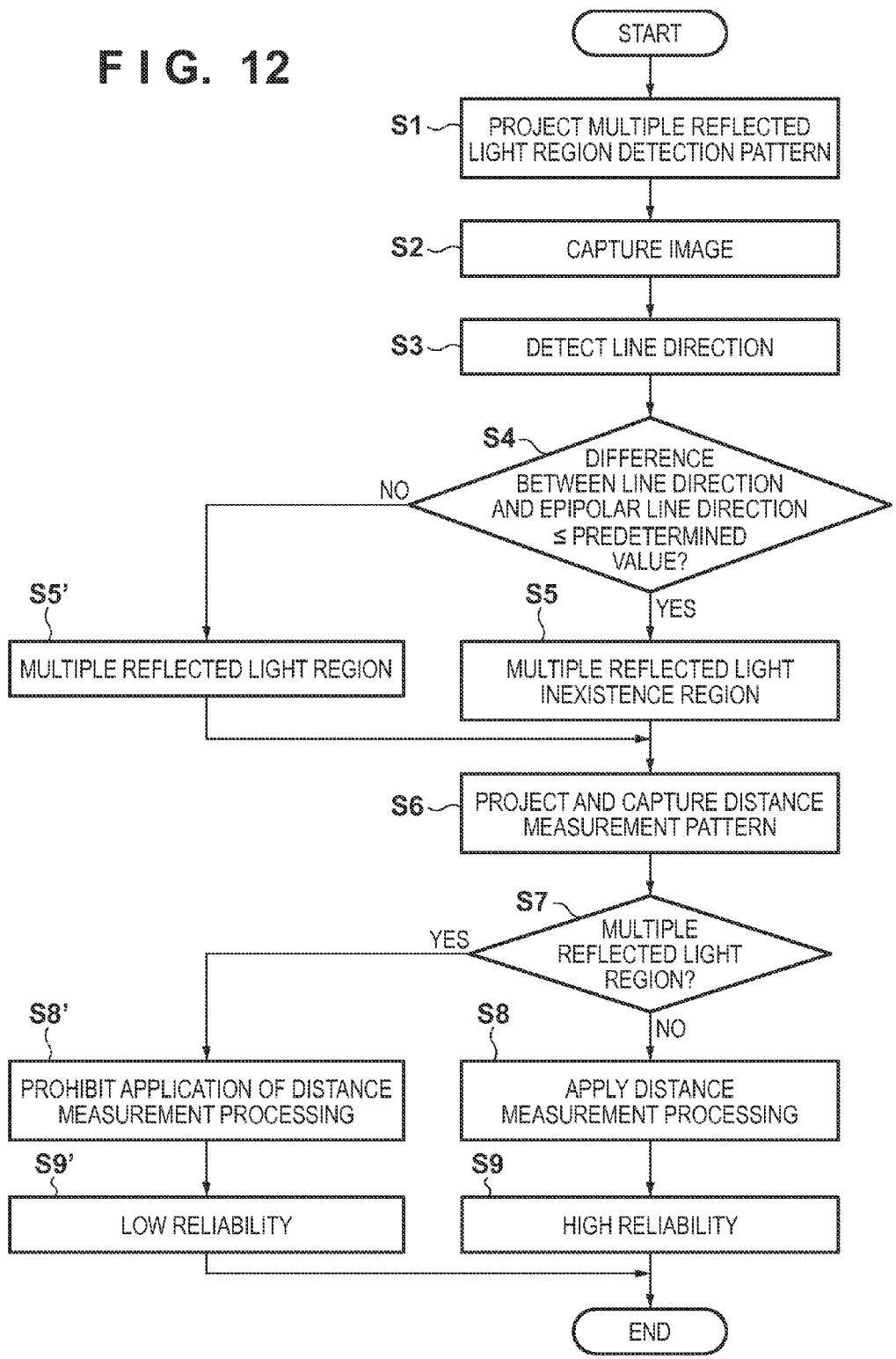
FIG. 12 is a flowchart illustrating the procedure of processing according to the second embodiment.

The schematic arrangement of a distance measurement apparatus according to the second embodiment is the same as in FIG. 1 described in the first embodiment, and a description thereof will not be repeated. The procedure of processing of the distance measurement apparatus according to the second embodiment will be described with reference to the flowchart of FIG. 12. The processes of step S1 to S7 are the same as the corresponding processes of the first embodiment, and a description thereof will not be repeated.

In the first embodiment, distance measurement processing of step S8 is applied to only a multiple reflected light inexistence region. In the second embodiment, distance measurement processing of step S8 is applied to even a multiple reflected light region. However, when a subregion is a multiple reflected light inexistence region, the process advances from step S8 to step S9 to determine the reliability of the measurement result as a high reliability. If a subregion is a multiple reflected light existence region, the process advances from step S8' to step S9' to determine the reliability of the measurement result as a low reliability.

According to the second embodiment, giving a reliability based on the detection result of a multiple reflected light region makes it possible to select the measurement result based on each reliability in processing after the measurement result has been transferred.

The distance measurement apparatus according to the second embodiment of the present invention has been described above.

(Third Embodiment)

The schematic arrangement of a distance measurement apparatus according to the third embodiment is the same as in FIG. 1 described in the first embodiment, and a description thereof will not be repeated. The procedure of processing of the distance measurement apparatus according to the third embodiment is the same as the processes of steps S1 to S7 described with reference to FIG. 6 of the first embodiment.

The third embodiment is different in that the processing to be applied to detect a line direction in step S3 uses spatial frequency analysis, and the process of step S4 changes accordingly.

Figure 13A:
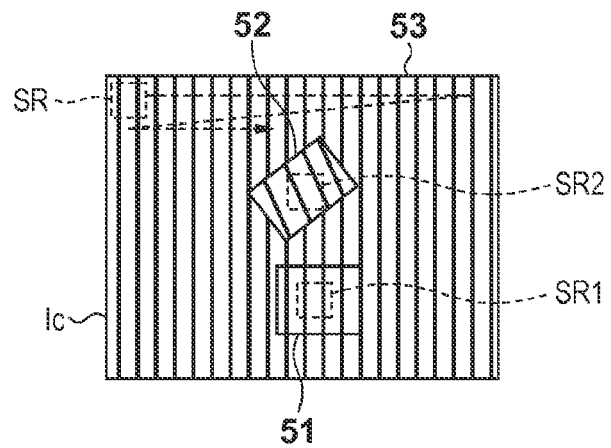
FIGS. 13A to 13E are explanatory views of line direction detection by spatial frequency analysis.

Line direction detection based on spatial frequency analysis will be described in detail with reference to FIGS. 13A to 13E. Even when spatial frequency analysis is used, a captured image is divided into subregions SR each having a specific size, as shown in FIG. 13A, and the line direction is detected in each subregion. As in the first embodiment, the subregions SR in the image are two-dimensionally scanned on the screen, thereby detecting the line direction of each subregion.

Figure 13B:
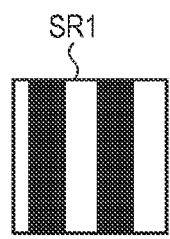
Figure 13C:
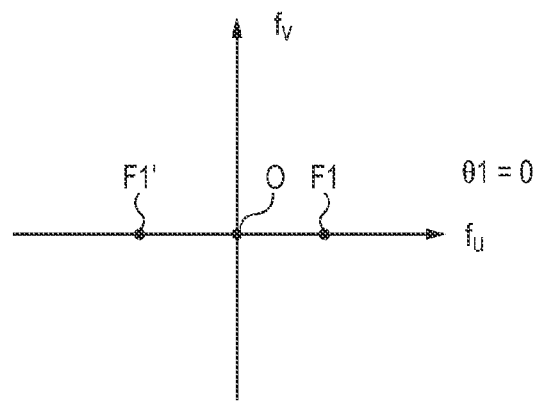

In the third embodiment, two-dimensional discrete Fourier transformation is performed for the subregion SR. FIGS. 13B and 13C show an enlarged view of a subregion SR1 and the result of two-dimensional discrete Fourier transformation for the subregion SR1, respectively. Similarly, FIGS. 13D and 13E show an enlarged view of a subregion SR2 and the result of two-dimensional discrete Fourier transformation for the subregion SR2, respectively.

Figure 13D:
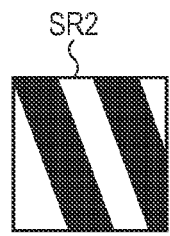
Figure 13E:
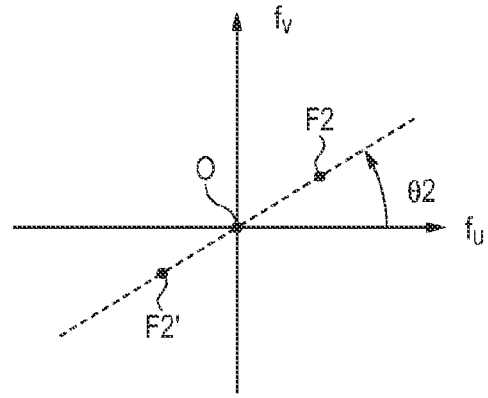

In FIGS. 13C and 13E, the image is expressed by a spatial frequency domain. The abscissa represents the spatial frequency component in the u direction, and the ordinate represents the spatial frequency component in the v direction. Each point on the graphs represents the peak point of an absolute value of two-dimensional discrete Fourier transformation.

In the subregion SR1 whose most part is occupied by vertical lines, as shown in the enlarged view of FIG. 13B, an origin O and peak points F1 and F1' on the u-axis appear, as shown in FIG. 13C. That is, an angle $\theta 1$ made by each peak point and the origin O is 0.

On the other hand, in the subregion SR2 whose most part is occupied by oblique lines, as shown in the enlarged view of FIG. 13D, the origin O and peak points F2 and F2' on a line obtained by rotating the abscissa by an angle $\theta 2$ about the origin O appear, as shown in FIG. 13E. In line direction detection based on spatial frequency analysis, the angle made by the abscissa and the line that connects the peak points and the origin is output as the line direction.

In step S4, the angle made by the abscissa and the line that connects the peak points and the origin in the spatial frequency domain in the direction of an epipolar line ELc is calculated in advance. It is then determined whether the difference between the line direction detected in step S3 and the epipolar line direction is equal to or smaller than a predetermined value.

Note that examples of line direction detection using edge detection filters have been described in the first and second embodiments, and an example of line direction detection by spatial frequency analysis has been described in the third embodiment. However, the line direction detection methods applicable to the present invention are not limited to those two methods.

The distance measurement apparatus according to the third embodiment has been described above.

(Fourth Embodiment)

The schematic arrangement of a distance measurement apparatus according to the fourth embodiment is the same as in FIG. 1 described in the first embodiment, and a description thereof will not be repeated. In the fourth embodiment, an example will be described in which a multiple reflected light region level is calculated based on image luminance information and the angular difference between a line direction and an epipolar line direction. The procedure of processing of an image processing apparatus according to the fourth embodiment will be explained below.

In step S101, a projection unit 1 projects a multiple reflected light region detection pattern onto a measurement target object 5.

In step S102, an image capturing unit 2 captures the measurement target object 5 on which the multiple reflected light region detection pattern is projected.

In step S103, an image acquisition unit 32 acquires the image captured in step S102, and a multiple reflection region detection unit 33 detects (extracts) the line direction from the image. At this time, the image is divided into subregions SR each having a specific size, as shown in FIG. 8A, and the line direction is detected in each subregion. To calculate the line direction, edge detection filters used in the first embodiment, spatial frequency analysis used in the third embodiment, or the like is usable.

In step S104, the multiple reflection region detection unit 33 calculates an angular difference Δθ between the line direction of each subregion SR detected in step S103 and the direction of an epipolar line, corresponding to the subregion SR, on the image plane of the image capturing unit 2.

Letting θ1 be the detected line direction, and θe be the epipolar line direction, the angular difference Δθ is given by $$\Delta\theta = abs(\theta 1 - \theta e) \quad (8)$$

where abs( ) is a function for outputting the absolute value of the signed value in the parentheses.

In step S105, a multiple reflection region level Dr is calculated. The multiple reflected light region level is a value representing a region's likelihood to be a multiple reflected light region. The larger the value is, the higher the possibility of the region to be a multiple reflection region is. The multiple reflection region level Dr is a function of the angular difference Δθ calculated in step S104 and image luminance information Lum, which is given by $$Dr = g(Lum, \Delta\theta) \quad (9)$$

As the function g(Lum, Δθ), for example, Lum×Δθ can be used. This uses the fact that the larger the angular difference Δθ is, the higher the possibility of the region to be a multiple reflected light region is. As the image luminance information Lum, an average value Lave of image luminances of a subregion is usable. If the image luminance average value of a subregion is small, the line direction detection accuracy lowers. Hence, the accuracy of the angular difference Δθ lowers. When calculating the multiple reflection region level, a line direction detection error that occurs due to a lower image luminance can be compensated using the image luminance information together. As the image luminance information, not only the average value but also a variance Lave of image luminances, a difference Lmax−min between the maximum and minimum values of image luminances in a subregion, a contrast Lcon in a subregion, and the like are usable. As the variance, maximum value−minimum value, or contract value in a subregion increases, the line is more clearly observed in the image, and the line direction detection accuracy tends to be improved.

In the fourth embodiment, image luminance information is used as information other than the angular difference between the line direction and the epipolar line direction. However, usable information is not limited to this. For example, the spatial frequency of the image can also be used. The spatial frequency of a line is almost constant in the image. For this reason, the larger the spectrum relative to other frequency spectra is, the higher the line direction detection accuracy is.

In step S106, a multiple reflected light region is detected based on the multiple reflection region level Dr.

In step S107, a projection pattern control unit 31 controls the projection unit 1 and the image capturing unit 2 and causes them to project and capture a distance measurement pattern. The same processing as in the procedure of step S6 of the first embodiment is executed here.

In step S108, a distance calculation unit 34 performs distance measurement processing. The same processing as in the procedure of step S8 of the first embodiment is executed here.

In step S109, a distance measurement reliability is output. The multiple reflection region level is obtained by h(Dr) that is a function of Dr. The higher the multiple reflection region level Dr is, the lower the distance measurement reliability is. Hence, 1/Dr that is the reciprocal of the multiple reflection region level Dr can be used as h(Dr).

An example of the distance measurement apparatus according to the fourth embodiment has been described above.

In the first to fourth embodiments, a distance measurement apparatus having a distance calculation unit has been described. However, even an arrangement without the distance calculation unit is also effective. That is, detecting a multiple reflected light region from an image and applying measurement target object recognition processing or the like is applied based on the detection result makes it possible to perform image processing with reduced influence of noise by multiple reflected light.

According to the present invention, it is possible to reduce the influence of noise generated by multiple reflection by effectively detecting a multiple reflected light region using pattern projection and simple image processing.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-279862 filed on Dec. 15, 2010, which is hereby incorporated by reference herein in its entirety.

What is claimed is:
1. An image processing apparatus comprising:
a projection unit adapted to project pattern light onto an image capturing target object;
an image capturing unit adapted to capture an image of the image capturing target object on which the pattern light is projected;

a calculation unit adapted to calculate a direction of a line of the pattern light in each predetermined region of the image;

a decision unit adapted to decide an epipolar line based on a relative positional relationship between said projection unit and said image capturing unit;

a determination unit adapted to determine whether an angle made by the direction of the epipolar line and the direction of the line is not more than a predetermined value; and a detection unit adapted to, upon determining that the angle is not more than the predetermined value, detect the region as a first region, and upon determining that the angle is more than the predetermined value, detect the region as a second region, wherein said projection unit projects the pattern light having a line component parallel to the epipolar line.

2. The apparatus according to claim 1, wherein said detection unit detects the first region as a 1st-order reflected light region in which the pattern light is reflected only once, and the second region as a multiple reflected light region in which the pattern light is reflected a plurality of number of times.

3. A distance measurement apparatus comprising:

an image processing apparatus of claim 2; and a measurement unit adapted to measure a distance up to an image capturing target object.

4. The apparatus according to claim 3, wherein said measurement unit measures the distance up to the image capturing target object for a region detected by a detection unit as a 1st-order reflected light region.

5. The apparatus according to claim 3, wherein said measurement unit defines a reliability of a distance measurement result for the region detected by said detection unit as the 1st-order reflected light region as a reliability higher than a reliability of a distance measurement result for a region detected by said detection unit as a multiple reflected light region.

6. The apparatus according to claim 1, wherein said calculation unit calculates the direction of the line using an edge detection filter.

7. The apparatus according to claim 1, wherein said calculation unit calculates the direction of the line using spatial frequency analysis.

8. A method of controlling an image processing apparatus, comprising:

causing a projection unit to project pattern light onto an image capturing target object;

causing an image capturing unit to capture an image of the image capturing target object on which the pattern light is projected;

calculating a direction of a line of the pattern light in each predetermined region of the image;

deciding an epipolar line based on a relative positional relationship between the projection unit and the image capturing unit;

determining whether an angle made by the direction of the epipolar line and the direction of the line is not more than a predetermined value; and upon determining that the angle is not more than the predetermined value, detecting the region as a first region, and upon determining that the angle is more than the predetermined value, detecting the region as a second region, wherein in the causing the projection unit to project the pattern light, the pattern light having a line component parallel to the epipolar line is projected.

9. A computer-readable non-transitory storage medium storing a computer program that causes a computer to execute each step of an image processing apparatus control method of claim 8.

* * * * *